(12) United States Patent
Horstman et al.

(10) Patent No.: US 8,674,048 B2
(45) Date of Patent: Mar. 18, 2014

(54) METHOD FOR CHEMICALLY INCORPORATING METAL ELEMENTS INTO POLYSILOXANES

(75) Inventors: John Bernard Horstman, Midland, MI (US); Nanguo Liu, Midland, MI (US); Randall Gene Schmidt, Midland, MI (US)

(73) Assignee: Dow Corning Corporation, Midland, MI (US)

(*) Notice: Subject to any disclaimer, the term of this patent is extended or adjusted under 35 U.S.C. 154(b) by 26 days.

(21) Appl. No.: 13/379,370

(22) PCT Filed: Jun. 30, 2010

(86) PCT No.: PCT/US2010/040510
§ 371 (c)(1),
(2), (4) Date: Dec. 20, 2011

(87) PCT Pub. No.: WO2011/002826
PCT Pub. Date: Jan. 6, 2011

(65) Prior Publication Data
US 2012/0101222 A1    Apr. 26, 2012

Related U.S. Application Data

(60) Provisional application No. 61/222,693, filed on Jul. 2, 2009.

(51) Int. Cl.
*C08G 77/06*  (2006.01)
(52) U.S. Cl.
USPC .................. 528/10; 528/43; 528/33; 528/39
(58) Field of Classification Search
USPC .......................................... 528/10, 33, 39, 43
See application file for complete search history.

(56) References Cited

U.S. PATENT DOCUMENTS

| | | |
|---|---|---|
| 3,625,934 A | 12/1971 | Rinse |
| 4,361,691 A | 11/1982 | Yajima et al. |
| 4,455,414 A | 6/1984 | Yajima et al. |
| 4,746,366 A * | 5/1988 | Philipp et al. ............ 106/287.19 |
| 5,357,024 A | 10/1994 | Leclaire |
| 5,401,528 A | 3/1995 | Schmidt |
| 5,548,050 A | 8/1996 | Kushibiki et al. |
| 5,563,228 A | 10/1996 | Ogawa et al. |
| 5,756,628 A | 5/1998 | Tani et al. |
| 6,495,708 B1 | 12/2002 | Yang et al. |
| 6,676,740 B2 | 1/2004 | Matsumura et al. |
| 7,052,770 B2 | 5/2006 | Furuya et al. |
| 7,652,157 B2 | 1/2010 | Kniajanski et al. |
| 2007/0154561 A1 | 7/2007 | Takeda et al. |

FOREIGN PATENT DOCUMENTS

| | | |
|---|---|---|
| EP | 1038517 | 9/2007 |
| JP | 2002179794 | 6/2002 |
| WO | 2006100018 | 9/2006 |
| WO | 2008032859 | 3/2008 |

OTHER PUBLICATIONS

English language translation (machine) JP 2002-179794, Jun. 26, 2002.*

* cited by examiner

*Primary Examiner* — Margaret Moore
(74) *Attorney, Agent, or Firm* — Catherine U. Brown

(57) ABSTRACT

This invention relates to methods for preparing polyheterosiloxane materials having at least two different non-Si metal elements. The polyheterosiloxane materials prepared by these methods are solid materials which can be easily dispersed in a solvent of choice.

8 Claims, No Drawings

US 8,674,048 B2

METHOD FOR CHEMICALLY INCORPORATING METAL ELEMENTS INTO POLYSILOXANES

CROSS REFERENCE TO RELATED APPLICATIONS

This application is a U.S. national stage filing under 35 U.S.C. §371 of PCT Application No. PCT/US10/40510 filed on 30 Jun. 2010, currently pending, which claims the benefit of U.S. Patent Application No. 61/222,693 filed 2 Jul. 2009 under 35 U.S.C. §119 (e). PCT Application No. PCT/US10/40510 and EP Patent Application No. 61/222,693 are hereby incorporated by reference.

BACKGROUND OF THE INVENTION

This invention relates to methods for preparing polyheterosiloxanes with chemically bonded non-Si metal elements using both metal salts and metal alkoxides. The metal salts and metal alkoxides can contain the same or different metal elements. The polyheterosiloxanes prepared by these methods are solid materials which can be easily dispersed in a solvent of choice.

Incorporation of metal elements into polysiloxanes has been of great interest for a wide range of applications due to their ability to impart high refractive index, impact resistance, scratch resistance, fire retardance, anti-corrosion, anti-stain, etc. Generally, two synthetic methods have previously been used to prepare the hybrid materials containing metal elements and polysiloxanes. One method involves modification of prefabricated metal oxide particles with organosilanes or polysiloxanes. This particle modification method often confronts challenges on particle aggregation, dispersion, and opacity issues. Further, the inhomogeneity of the metal oxides severely limits their use for optical and electronic applications. The other method is based on sol-gel hydrolysis and condensation chemistries involving a two-component system of metal alkoxides and alkoxysilanes. The type of metal elements incorporated into the polysiloxane resins by this method is limited by the availability of the metal alkoxide precursors since metal elements other than Ti, Zr, Al, Ge, and Sn are either not available or difficult to synthesize.

The inventors have unexpectedly discovered that adding both a metal alkoxide and a hydrolyzable metal salt in a siloxane polymerization reaction provides a convenient method of incorporating various metal elements into an organosiloxane via Metal-O—Si and Metal-O-Metal oxo-linkages. Thus, the present invention relates to methods of making polyheterosiloxanes having at least two non-Si metal elements which utilize both metal salts and metal alkoxides.

BRIEF SUMMARY OF THE INVENTION

The present invention relates to a method for preparing a polyheterosiloxane having at least two non-Si metal elements comprising the step of: (1) adding an amount of water to a dispersion comprising (A) at least one metal (M1) alkoxide, (B) at least one silicon-containing material, and (C) at least one hydrolyzable metal (M2) salt so a polyheterosiloxane having at least two non-Si metal elements is formed.

DETAILED DESCRIPTION OF THE INVENTION

The present invention provides a method for preparing a polyheterosiloxane having at least two non-Si metal elements comprising reacting:

(A) a metal (M1) alkoxide,
(B) a silicon-containing material having hydrolyzable groups selected from
 (B1) an organosiloxane, or
 (B2) a silane, and
(C) a hydrolyzable metal (M2) salt, with an amount of water that provides between 50 and 200% necessary to hydrolyze and condense the alkoxy groups and other hydrolyzable groups on Components (A), (B), and (C), to form the polyheterosiloxane, with the proviso that at least two non-Si metal elements are provided by Component (A) and/or (C). In one embodiment, (M1) and (M2) are non-Si metal elements and different from each other.

As used herein, the expression "at least one" means one or more and this includes individual components as well as mixtures/combinations.

Component (A) is a metal (M1) alkoxide. In one embodiment of the present invention the metal (M1) alkoxide (A) is selected from metal alkoxides having a general formula (I) $R^1_m M1O_n X_p (OR^2)_{v1-m-p-2n}$, where M1 is selected from Ti, Al, Ge, Zr, Sn, Cr, Ca, Ba, Sb, Cu, Ga, Hf, In, Fe, Mg, Mo, Nb, Ce, Er, La, Nd, Pr, Sm, Y, Sr, Ta, Te, W, and V, each X is independently selected from carboxylate ligands, organosulfonate ligands, organophosphate ligands, β-diketonate ligands, and chloride ligands, v1 is the oxidation state of M1, m is a value from 0 to 3, n is a value from 0 to 2, p is a value from 0 to 3, each $R^1$ is an alkyl group having from 1 to 18 carbon atoms, each $R^2$ is an independently selected monovalent alkyl group having from 1 to 6 carbon atoms, aryl group having from 6 to 8 carbon atoms, or a polyether group having a general formula (VI) —$(R^3O)_q R^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms, Component (B) is a silicon-containing material having hydrolyzable groups selected from (B1) an organosiloxane, or (B2) a silane. In one embodiment, component (B) is at least one silicon-containing material selected from (B1) an organosiloxane having an average formula (II) $R^5_b(R^6O)_a SiO_{(4-(a+b))/2}$ or (B2) a silane having a general formula (III) $R^5_c SiY_d$, where Y is Cl or $OR^6$, each $R^5$ is an independently selected hydrogen atom, alkyl group having 1 to 18 carbon atoms, alkenyl group having from 2 to 18 carbon atoms, aryl group having from 6 to 12 carbon atoms, epoxy group, amino group, or carbinol group, $R^6$ is an independently selected hydrogen atom or alkyl group having from 1 to 6 carbon atoms, aryl group having from 6 to 8 carbon atoms, or a polyether group having a general formula (VI) —$(R^3O)_q R^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms, a is a value from 0.1 to 3, b is a value from 0.5 to 3, and (a+b) is a value from 0.6 to 3.9, c is a value from 0 to 3, d is a value from 1 to 4 and (c+d) equals 4, and Component (C) is a hydrolyzable metal (M2) salt. In one embodiment, the hydrolyzable metal (M2) salt is selected from (C1) a non-hydrated metal salt having a general formula (IV) $R^7_e M2(Z)_{(v2-e)/w}$ or (C2) a hydrated metal salt having a general formula (V) $M2(Z)_{v2/w} \cdot xH_2O$, where M2 is selected from any of the metal elements in the periodic table, v2 is the oxidation state of M2, w is the oxidation state of ligand Z where Z is independently chosen from carboxylates, β-diketonates, fluoride, chloride, bromide, iodide, organic sulfonate, nitrate, nitrite, sulphate, sulfite, cyanide, phosphites, phosphates, organic phosphites, organic phosphates, and oxalate, each $R^7$ is an independently selected alkyl group having 1 to 18 carbon atoms, alkenyl group having from 2 to 8 carbon atoms, or aryl group having from 6 to 8 carbon atoms, e is a value from 0 to 3 and x is a value from 0.5-12, so a polyheterosiloxane having at least two non-Si metal elements is formed, where the total amount of water added is between 50 and 200% of the amount theoretically necessary for the hydrolysis and condensation of all alkoxy groups and other hydrolyzable groups on Components (A), (B), and (C).

Component (A) may comprise at least one metal alkoxide selected from metal alkoxides having a general formula (I) $R^1_m M1 O_n X_p (OR^2)_{v1-m-p-2n}$, where M1 is selected from Ti, Al, Ge, Zr, Sn, Cr, Ca, Ba, Sb, Cu, Ga, Hf, In, Fe, Mg, Mo, Nb, Ce, Er, La, Nd, Pr, Sm, Y, Sr, Ta, Te, W, and V, each X is independently selected from carboxylate ligands, organosulfonate ligands, organophosphate ligands, β-diketonate ligands, and chloride ligands, subscript v1 is the oxidation state of M1, m is a value from 0 to 3, n is a value from 0 to 2, p is a value from 0 to 3, each $R^1$ is a monovalent alkyl group having from 1 to 18 carbon atoms, each $R^2$ is an independently selected monovalent alkyl group having from 1 to 6 carbon atoms, aryl group having from 6 to 8 carbon atoms, or a polyether group having a general formula (VI) —$(R^3O)_q R^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms.

In Formula (I), $R^1$ is a monovalent alkyl group having from 1 to 18 carbon atoms. Examples of the alkyl group of $R^1$ include methyl, ethyl, propyl, isopropyl, butyl, t-butyl, hexyl, octyl, decyl, dodecyl, hexadecyl, and octadecyl. Alternatively, the alkyl group comprises 1 to 8 carbon atoms. Alternatively, the alkyl group is methyl, ethyl, propyl, butyl, hexyl, and octyl.

In Formula (I), each $R^2$ is an independently selected monovalent alkyl group having from 1 to 6 carbon atoms, aryl group having from 6 to 8 carbon atoms, or a polyether group having a general formula (VI) —$(R^3O)_q R^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms.

Examples of the alkyl groups of $R^2$ include methyl, ethyl, propyl, isopropyl, butyl, t-butyl, and hexyl. Examples of the aryl groups of $R^2$ include phenyl and benzyl.

Examples of the divalent alkylene group having from 2 to 6 carbon atoms of $R^3$ include —$CH_2CH_2$— and —$CH_2CH(CH_3)$—. Examples of the alkyl groups having from 1 to 6 carbon atoms of $R^4$ are as described above for $R^2$. Subscript q in Formula (VI) is a value from 1 to 4, alternatively 1 to 2. Examples of the polyether group of Formula (VI) include methoxyethyl, methoxypropyl, methoxybutyl, ethoxyethyl, ethoxypropyl, ethoxybutyl, methoxyethoxyethyl, and ethoxyethoxyethyl.

Alternatively, $R^2$ is $R^2$ is alkyl group having from 1 to 6 carbon atoms, alternatively ethyl, propyl, and butyl, alternatively propyl and butyl.

In Formula (I), X is selected from carboxylate ligands, organosulfonate ligands, organophosphate ligands, β-diketonate ligands, and chloride ligands, alternatively carboxylate ligands and β-diketonate ligands. The carboxylate ligands useful for X have a formula $R^{15}COO$— where $R^{15}$ is selected from hydrogen, alkyl groups, alkenyl groups, and aryl groups. Examples of useful alkyl groups for $R^{15}$ include alkyl groups having from 1 to 18 carbon atoms, alternatively 1 to 8 carbon atoms as described above for $R^1$. Examples of useful alkenyl groups for $R^{15}$ include alkenyl groups having from 2 to 18 carbon atoms, alternatively 2 to 8 carbon atoms such as vinyl, 2-propenyl, allyl, hexenyl, and octenyl. Examples of useful aryl groups for $R^{15}$ include aryl groups having from 6 to 18 carbon atoms, alternatively 6 to 8 carbon atoms such as phenyl and benzyl. Alternatively $R^{15}$ is methyl, 2-propenyl, allyl, and phenyl.

The β-diketonate ligands useful for X can have the following structures:

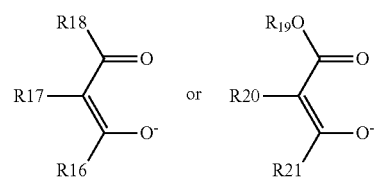

where $R^{16}$, $R^{18}$, and $R^{21}$ are selected from monovalent alkyl and aryl groups. Examples of useful alkyl groups for $R^{16}$, $R^{18}$, and $R^{21}$ include alkyl groups having from 1 to 12 carbon atoms, alternatively 1 to 4 carbon atoms such as methyl, ethyl, trifluoromethyl, and t-butyl. Examples of useful aryl groups for $R^{16}$, $R^{18}$, and $R^{21}$ include aryl groups having from 6 to 18 carbon atoms, alternatively 6 to 8 carbon atoms such as phenyl and tolyl. $R^{19}$ is selected from alkyl groups, alkenyl groups and aryl groups. Examples of useful alkyl groups for $R^{19}$ include C1 to C18 alkyl groups, alternatively C1 to C8 alkyl groups such as methyl, ethyl, propyl, hexyl and octyl. Examples of useful alkenyl groups for $R^{19}$ include alkenyl groups having from 2 to 18 carbon atoms, alternatively C2 to C8 carbon atoms such as allyl, hexenyl, and octenyl. Examples of useful aryl groups for $R^{19}$ include aryl groups having from 6 to 18 carbon atoms, alternatively 6 to 8 carbon atoms such as phenyl and tolyl. $R^{17}$ and $R^{20}$ are hydrogen or alkyl, alkenyl, and aryl groups. Examples of useful alkyl groups for $R^{17}$ and $R^{20}$ include alkyl groups having from 1 to 12 carbon atoms, alternatively 1 to 8 carbon atoms such as methyl and ethyl. Examples of useful alkenyl groups for $R^{17}$ and $R^{20}$ include alkenyl groups having from 2 to 18 carbon atoms, alternatively 2 to 8 carbon atoms such as vinyl, allyl, hexenyl, and octenyl. Examples of useful aryl groups for $R^{17}$ and $R^{20}$ include aryl groups having from 6 to 18 carbon atoms, alternatively 6 to 8 carbon atoms such as phenyl and tolyl. $R^{16}$, $R^{17}$, $R^{18}$, $R^{19}$, $R^{20}$, and $R^{21}$ are each independently selected and can be the same or different.

Each metal alkoxide group described by Formula (I) contains a metal (M1) element selected from Ti, Al, Ge, Zr, Sn, Cr, Ca, Ba, Sb, Cu, Ga, Hf, In, Fe, Mg, Mo, Nb, Ce, Er, La, Nd, Pr, Sm, Y, Sr, Ta, Te, W, and V. Alternatively, M1 is Ti, Zr, Al, Ge, Ta, Nb, and Sn. Alternatively, M1 is Ti, Zr, Al, and Sn.

In Formula (I), subscript v1 is the oxidation state of M1, ranging from 1 to 7. Alternatively, v1 ranges from 1 to 5.

In Formula (I), subscript m is a value from 0 to 3, alternatively 0 to 2, alternatively 0.

In Formula (I), subscript n is a value from 0 to 2, alternatively 0 to 1, alternatively 0.

In Formula (I), subscript p is a value from 0 to 3, alternatively 0 to 2, alternatively 0.

Examples of the metal alkoxides described by Formula (I) useful in the present method include titanium tetrapropoxides, titanium tetrabutoxides, zirconium tetrapropoxides, and zirconium tetrabutoxides from DuPont, aluminum tripropoxides, aluminum tributoxides, aluminum phenoxide, antimony (III) ethoxide, barium isopropoxide, cadmium ethoxide, cadmium methoxide, cadmium methoxyethoxide, chromium (III) isopropoxide, copper (II) ethoxide, copper (II) methoxyethoxyethoxide, gallium ethoxide, gallium isopropoxide, diethyldiethoxygermane, ethyltriethoxygermane, methyltriethoxygermane, tetra-n-butoxygermane, hafnium ethoxide, hafnium 2-ethylhexoxide, hafnium 2-methoxymethyl-2-propoxide, indium methoxyethoxide, iron (III) ethoxide, magnesium ethoxide, magnesium methoxyethoxide, magnesium n-propoxide, molybdenum (V) ethoxide, niobium (V) n-butoxide, niobium (V) ethoxide, cerium (IV) t-butoxide, cerium (IV) isopropoxide, cerium (IV) ethylthioethoxide, cerium (IV) methoxyethoxide, erbium methoxyethoxide, lanthanum isopropoxide, lanthanum methoxyethoxide, neodymium methoxyethoxide, praseodymium methoethoxide, samarium (III) isopropoxide, yttrium isopropoxide, yttrium methoxyethoxide, strontium isopropoxide, strontium methoxypropoxide, tantalum (V) ethoxide, tantalum (V) methoxide, tantalum (V) isopropoxide, tantalum tetraethoxide dimethylaminoethoxide, di-n-butyldi-n-butoxytin, di-n-butyldimethoxytin, tetra-t-butoxytin, tri-n-butylethoxytin, titanium ethoxide, titanium 2-ethylhexoxide, titanium methoxide, titanium methoxypropoxide, titanium n-nonyloxide, tungsten (V) ethoxide, tungsten (VI) ethoxide, vanadium triisobutoxide oxide, vanadium triisopropoxide oxide, vanadium tri-n-propoxide oxide, vanadium oxide tris(methoxyethoxide), zinc methoxyethoxide, zirconium ethoxide, zirconium 2-ethylhexoxide, zirconium 2-methyl-2-butoxide, and zirconium 2-methoxymethyl-2-propoxide, aluminum s-butoxide bis (ethylacetoacetate), aluminum di-s-butoxide ethylacetoacetate, aluminum diisopropoxide ethylacetoacetate, aluminum 9-octdecenylacetoacetate diisopropoxide, tantalum (V) tetraethoxide pentanedionate, titanium allylacetoacetate triisopropoxide, titanium bis(triethanolamine) diisopropoxide, titanium chloride triisopropoxide, titanium dichloride diethoxide, titanium diisopropoxy bis(2,4-pentanedionate), titanium diisopropoxide bis(tetramethylheptanedionate), titanium diisopropoxide bis(ethylacetoacetate), titanium methacrylate triisopropoxide, titanium methacryloxyethylacetoacetate triisopropoxide, titanium trimethacrylate methoxyethoxyethoxide, titanium tris(dioctylphosphato) isopropoxide, titanium tris(dodecylbenzenesulfonate) isopropoxide, zirconium (bis-2,2'-(alloxymethyl)-butoxide) tris(dioctylphosphate), zirconium diisopropoxide bis(2,2,6, 6-tetramethyl-3,5-heptanedionate), zirconium dimethacrylate dibutoxide, zirconium methacryloxyethylacetoacetate tri-n-propoxide.

The metal alkoxides described by Formula (I) are generally available from Gelest (Morrisville, Pa. USA).

Component (B) is a silicon-containing material having hydrolyzable groups selected from (B1) an organosiloxane, or (B2) a silane. In one embodiment, component (B) is at least one silicon-containing material selected from (B1) an organosiloxane having an average formula (II) $R^5_b(R^6O)_a SiO_{(4-(a+b))/2}$ or (B2) a silane having a general formula (III) $R^5_c SiY_d$, where Y is Cl or $OR^6$, each $R^5$ is an independently selected hydrogen atom, alkyl group having 1 to 18 carbon atoms, alkenyl group having from 2 to 18 carbon atoms, aryl group having from 6 to 12 carbon atoms, epoxy group, amino group, or carbinol group, $R^6$ is an independently selected hydrogen atom or alkyl group having from 1 to 6 carbon atoms, aryl group having from 6 to 8 carbon atoms, or a polyether group having a general formula (VI) —$(R^3O)_q R^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms, a is a value from 0.1 to 3, b is a value from 0.5 to 3, and (a+b) is a value from 0.6 to 3.9, c is a value from 0 to 3, d is a value from 1 to 4 and (c+d) equals 4.

Formula (II) are composed of M, D, T, and Q building blocks. By definition, M building block refers to a siloxy unit that contains one silicon atom bonded to one oxygen atom, with the remaining three substituents on the silicon atom being other than oxygen. D building block refers to a siloxy unit that contains one silicon atom bonded to two oxygen atoms, with the remaining two substituents on the silicon atom being other than oxygen. T building block refers to a siloxy unit that contains one silicon atom bonded to three oxygen atoms, with the remaining one substituent on the silicon atom being other than oxygen. Q building block refers to a siloxy unit that contains one silicon atom bonded to four oxygen atoms. Their molecular structures are listed below:

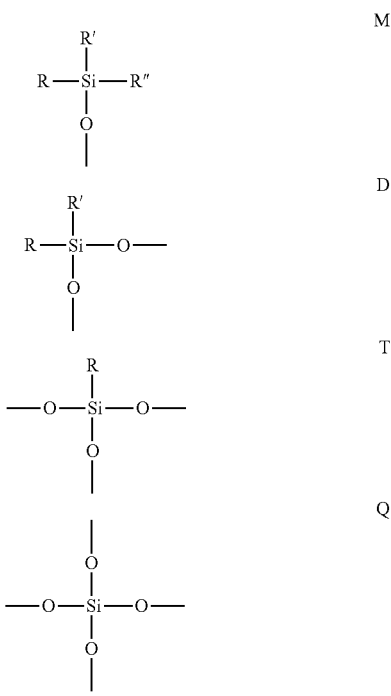

The alkyl groups having 1 to 18 carbon atoms of $R^5$ in Formulas (II) and (III) are as described above for $R^1$. Alternatively, the alkyl group comprises 1 to 6 carbon atoms; alternatively, the alkyl group is methyl, ethyl, propyl, butyl, and hexyl.

The alkenyl groups having from 2 to 18 carbon atoms of $R^5$ in Formulas (II) and (III) are illustrated by vinyl, propenyl, butenyl, pentenyl, hexenyl, or octenyl. Alternatively, the alkenyl group comprises 2 to 8 carbon atoms. Alternatively, the alkenyl group is vinyl, allyl, and hexenyl.

The aryl groups having 6 to 12 carbon atoms of $R^5$ in Formulas (II) and (III) are illustrated by phenyl, naphthyl, benzyl, tolyl, xylyl, methylphenyl, 2-phenylethyl, 2-phenyl-2-methylethyl, chlorophenyl, bromophenyl and fluorophenyl. Alternatively, the aryl group comprises 6 to 8 carbon atoms. Alternatively, the aryl group is phenyl.

The epoxy groups of $R^5$ in Formulas (II) and (III) are selected from glycidyl ether groups, alkyl epoxy groups and cycloaliphatic epoxy groups. The glycidyl ether group is illustrated by alkyl glycidyl ether groups such as 2-glycidoxyethyl, 3-glycidoxypropyl, 4-glycidoxybutyl, and 2-(3,4-epoxycyclohexyl)ethyl. Examples of the alkyl epoxy groups are 2,3-epoxypropyl, 3,4-epoxybutyl, and 4,5-epoxypentyl, and the cycloaliphatic epoxy group is illustrated by monovalent epoxycycloalkyl groups such as 3,4-epoxycyclohexylmethyl, 3,4-epoxycyclohexylethyl, 3,4-epoxycyclohexylpropyl, 3,4-epoxycyclohexylbutyl, and alkyl cyclohexene oxide groups. Alternatively, the epoxy group is 3-glycidoxypropyl.

The amino groups of $R^5$ in Formulas (II) and (III) typically have the formula —$R^9NHR^{10}$ or —$R^9NHR^9NHR^{10}$ wherein each $R^9$ is independently a divalent hydrocarbon radical having at least 2 carbon atoms and $R^{10}$ is hydrogen or an alkyl group having from 1 to 18 carbon atoms. Examples of the $R^9$ group include an alkylene radical having from 2 to 20 carbon atoms and are illustrated by —$CH_2CH_2$—, —$CH_2CH_2CH_2$—, —$CH_2CHCH_3$—, —$CH_2CH_2CH_2CH_2$—, —$CH_2CH(CH_3)CH_2$—, —$CH_2CH_2CH_2CH_2CH_2$—, —$CH_2CH_2CH_2CH_2CH_2CH_2$—, —$CH_2CH_2CH(CH_2CH_3)CH_2CH_2CH_2$—, —$CH_2CH_2CH_2CH_2CH_2CH_2CH_2CH_2$—, and —$CH_2CH_2CH_2CH_2CH_2CH_2CH_2CH_2CH_2CH_2$—. Alternatively, the alkyl groups of $R^{10}$ are methyl, ethyl, propyl, butyl, hexyl, octyl, decyl, dodecyl, hexadecyl, and octadecyl. Alternatively, when $R^{10}$ is an alkyl group it is methyl.

Typical aminofunctional hydrocarbon groups are —$CH_2CH_2NH_2$, —$CH_2CH_2CH_2NH_2$, —$CH_2CHCH_3NH$, —$CH_2CH_2CH_2CH_2NH_2$, —$CH_2CH_2CH_2CH_2CH_2NH_2$, —$CH_2CH_2CH_2CH_2CH_2CH_2NH_2$, —$CH_2CH_2NHCH_3$, —$CH_2CH_2CH_2NHCH_3$, —$CH_2(CH_3)CHCH_2NHCH_3$, —$CH_2CH_2CH_2CH_2NHCH_3$, —$CH_2CH_2NHCH_2CH_2NH_2$, —$CH_2CH_2CH_2NHCH_2CH_2NH_2$, —$CH_2CH_2CH_2NHCH_2CH_2CH_2NH_2$, —$CH_2CH_2NHCH_2CH_2NHCH_3$, —$CH_2CH_2CH_2NHCH_2CH_2CH_2NHCH_3$, —$CH_2CH_2CH_2CH_2NHCH_2CH_2CH_2CH_2NHCH_3$, and —$CH_2CH_2NHCH_2CH_2NHCH_2CH_2CH_3$.

The carbinol groups of $R^5$ in Formulas (II) and (III) are selected from carbinol groups free of aryl groups having at least 3 carbon atoms and aryl-containing carbinol groups having at least 6 carbon atoms. Generally a "carbinol" group is any group containing at least one carbon-bonded hydroxyl (COH) group. Thus the carbinol groups may contain more than one COH group such as for example

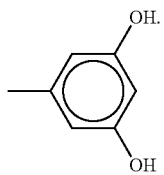

Carbinol groups free of aryl groups having at least 3 carbon atoms are illustrated by groups having the formula $R^{11}OH$ wherein $R^{11}$ is a divalent hydrocarbon group having at least 3 carbon atoms or a divalent hydrocarbonoxy group having at least 3 carbon atoms. The group $R^{11}$ is illustrated by alkylene groups selected from —$(CH_2)_s$— where s has a value of 3 to 10 and —$CH_2CH(CH_3)$—, —$CH_2CH(CH_3)CH_2$—, —$CH_2CH_2CH(CH_2CH_3)CH_2CH_2CH_2$—, and —$OCH(CH_3)(CH_2)_t$— wherein t has a value of 1 to 10. The carbinol group free of aryl groups having at least 3 carbon atoms is also illustrated by groups having the formula $R^{12}(OH) CH_2OH$ where $R^{12}$ is a group having the formula —$CH_2CH_2(CH_2)_tOCH_2CH$— wherein t has a value of 1 to 10. The aryl-containing carbinol group having at least 6 carbon atoms is illustrated by groups having the formula $R^{13}OH$ wherein $R^{13}$ is an arylene group selected from —$(CH_2)_uC_6H_4$—, —$CH_2CH(CH_3)(CH_2)_uC_6H_4$— wherein u has a value of 0 to 10, and —$(CH_2)_tC_6H_4(CH_2)_u$— wherein u and t are as described above. Alternatively, the aryl-containing carbinol groups have from 6 to 14 carbon atoms, alternatively 6 to 10 carbon atoms.

Amino and/or carbinol containing silanes or siloxanes are applicable for some metal-containing resins, such as tin, germanium, and aluminium, however, gelation problems may occur during the synthetic process with certain metal elements (such as Zn and Cu) because of the amino and carbinol silanes or siloxanes ability to chelate to certain metals.

Alternatively, each $R^5$ in Formulas (II) and (III) is an independently selected hydrogen atom, an alkyl group having from 1 to 6 carbon atoms, an alkenyl group having from 2 to 8 carbon atoms, or an aryl group having from 6 to 12 carbons atoms. Alternatively, each $R^5$ in Formulas (II) and (III) is an independently selected alkyl group having from 1 to 6 carbon atoms, an alkenyl group having from 2 to 6 carbon atoms, or an aryl group having from 6 to 8 carbons atoms. Alternatively, each $R^5$ is methyl, vinyl, or phenyl.

The $R^6$ group of Formula (II) is an independently selected hydrogen atom, alkyl group having from 1 to 6 carbon atoms, aryl group having from 6 to 8 carbon atoms, or a polyether group having a general formula (VI) —$(R^3O)_qR^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms or alkyl group. Examples of the alkyl group, aryl group and polyether group of $R^6$ are as described above for $R^2$. Alternatively, $R^6$ is a hydrogen atom or an alkyl group having from 1 to 4 carbon atoms. Alternatively, $R^6$ is hydrogen, methyl, or ethyl.

In Formula (II), subscript a is a value from 0.1 to 3, alternatively 1 to 3.

In Formula (II), subscript b is a value from 0.5 to 3, alternatively 1.5 to 2.5.

In Formula (II), subscripts (a+b) have a value from 0.6 to 3.9, alternatively 1.5 to 3.

Examples of the organosiloxanes (B1) described by Formula (II) and useful in the present method include oligomeric and polymeric organosiloxanes, such as silanol-terminated polydimethylsiloxane, polymethylmethoxysiloxane, polysilsesquioxane, alkoxy and/or silanol containing MQ resin, and combinations thereof. They are made by hydrolysis of the corresponding organomethoxysilanes, organoethoxysilanes, organoisopropoxysilanes, and organochlorosilanes.

In Formula (III), each Y is a chloro atom (Cl) or $OR^6$, where $R^6$ is as described above. Alternatively, Y is $OR^6$.

In Formula (III), subscript c is a value from 0 to 3, alternatively, c is a value from 1 to 3, alternatively, from 2 to 3.

In Formula (III), subscript d is a value from 1 to 4, alternatively d is a value from 1 to 3, alternatively, from 1 to 2.

In Formula (III), subscripts (c+d) equal 4.

Examples of the silanes (B2) described by Formula (III) include methyltrichlorosilane, phenyltrichlorosilane, dimethyldichlorosilane, phenylmethyldichlorosilane, methyltrimethoxysilane, phenyltrimethoxysilane, dimethyldimethoxysilane, phenylmethyldimethoxysilane, phenylsilanetriol, diphenylsilanediol, phenylmethylsilanediol, dimethylsilanediol, trimethylsilanol, triphenylsilanol, phenyldimethoxysilanol, phenylmethoxysilanediol, methyldimethoxysilanol, methylmethoxysilanediol, phenyldiethoxysilanol, phenylethoxysilanediol, methyldiethoxysilanol, methylethoxysilanediol, etc.

Component (C) may comprise at least one metal (M2) salt selected from (C1) a non-hydrated metal salt having a general formula (IV) $R^7_eM2(Z)_{(v2-e)/w}$ or (C2) a hydrated metal salt having a general formula (V) M2(Z)$_{v2/w}$·xH$_2$O, where M2 is selected from any of the metal elements in the Periodic Table, v2 is the oxidation state of M2, w is the oxidation state of ligand Z where Z is independently chosen from carboxylates, β-diketonates, fluoride, chloride, bromide, iodide, organic sulfonate, nitrate, nitrite, sulphate, sulfite, cyanide, phosphites, phosphates, organic phosphites, organic phosphates, and oxalate, each R$^7$ is an independently selected alkyl group having 1 to 18 carbon atoms, alkenyl group having from 2 to 8 carbon atoms, or aryl group having from 6 to 8 carbon atoms, e is a value from 0 to 3 and x is a value from 0.5 to 12 and describes the average number of H$_2$O molecules associated with each metal salt molecule.

In Formulas (IV) and (V), the metal element described by M2 is selected from all of the metals in the Periodic Table. Alternatively, M2 is selected from Li, Na, Ca, Mg, Ba, Ti, Zr, Ce, Eu, Nd, Er, Yb, Y, V, Cr, Mn, Fe, Co, Ni, Cu, Ag, Zn, Cd, Al, Ge, and Pb.

In Formulas (IV) and (V), subscript v2 is the oxidation state of M2 and can range from 1 to 7, alternatively 1 to 4.

In Formulas (IV) and (V), subscript w is the oxidation state of ligand Z and can range from 1 to 3, alternatively 1 to 2.

The Z group in Formulas (IV) and (V) describes the various counter ligands attached to the metal element (M2). Generally, each Z is independently selected from carboxylate ligands, β-diketonate ligands, fluoride ligand, chloride ligand, bromide ligand, iodide ligand, organic sulfonate ligands, nitrate ligand, nitrite ligand, sulphate ligand, sulfite ligand, cyanide ligand, phosphate ligand, phosphite ligand, organic phosphite ligands, organic phosphate ligands, and oxalate ligand.

The carboxylate ligands and β-diketonate ligands useful for Z are as described above for X.

The organic sulfonate ligands useful for Z have a formula R$^{22}$SO$_3$—, where R$^{22}$ is selected from monovalent alkyl groups, alkenyl groups and aryl groups. Examples of useful alkyl groups, alkenyl groups and aryl groups are as described above for R$^{15}$. Alternatively R$^{22}$ is tolyl, phenyl, and methyl.

The organic phosphate ligands useful for Z have a formula (R$^{23}$O)$_2$ PO$_2^-$ or R$^{23}$O—PO$_3^{2-}$, where R$^{23}$ is selected from monovalent alkyl groups, alkenyl groups and aryl groups. Examples of useful alkyl groups, alkenyl groups and aryl groups are as described above for R$^{15}$. Alternatively R$^{23}$ is phenyl, butyl, and octyl.

The organic phosphite ligands useful for Z have a formula (R$^{24}$O)$_2$ PO$^{31}$ or R$^{24}$O—PO$_2^{2-}$, where R$^{24}$ is selected from monovalent alkyl groups, alkenyl groups and aryl groups. Examples of useful alkyl groups, alkenyl groups and aryl groups are as described above for R$^{15}$. Alternatively R$^{24}$ is phenyl, butyl, and octyl.

Alternatively, Z in Formulas (IV) and (V) is independently selected from carboxylate ligands, β-diketonate ligands, nitrate ligand, sulphate ligand, and chloride ligand. Alternatively, Z includes carboxylate ligands and β-diketonate ligands.

In Formulas (IV) and (V), subscript e is a value from 0 to 3, alternatively 0 to 2, alternatively 0.

In Formula (IV), R$^7$ is an independently selected alkyl group having 1 to 18 carbon atoms, alkenyl group having from 2 to 8 carbon atoms, or aryl group having from 6 to 8 carbon atoms. Examples of R$^7$ are as described above for R$^5$.

In Formula (V), x is a value from 0.5 to 12, alternatively 1 to 9.

Examples of non-hydrated metal salts (C1) described by Formula (IV) useful in the present method include but are not limited to lithium acetate, sodium acetate, potassium acetate, rubidium acetate, cesium acetate, magnesium acetate, calcium acetate, strontium acetate, barium acetate, scandium acetate, yttrium acetate, luterium acetate, hafnium acetate, vanadium acetate, niobium acetate, tantalum acetate, chromium acetate, molybdenum acetate, tungsten acetate, manganese acetate, technetium acetate, rhenium acetate, iron acetate, ruthenium acetate, osmium acetate, cobalt acetate, rhodium acetate, iridium acetate, nickel acetate, palladium acetate, platinum acetate, copper acetate, silver acetate, zinc acetate, cadmium acetate, mercury acetate, aluminum acetate, gallium acetate, indium acetate, thallium acetate, tin, lead acetate, antimony acetate, bismuth acetate, lanthanum acetate, cerium acetate, praseodymium acetate, neodymium acetate, promethium acetate, samarium acetate, europium acetate, gadolinium acetate, terbium acetate, dysprosium acetate, holmium acetate, erbium acetate, thulium acetate, ytterbium acetate, lithium acetylacetonate, sodium acetylacetonate, potassium acetylacetonate, rubidium acetylacetonate, cesium acetylacetonate, beryllium acetylacetonate, magnesium acetylacetonate, calcium acetylacetonate, strontium acetylacetonate, barium acetylacetonate, scandium acetylacetonate, yttrium acetylacetonate, luterium acetylacetonate, titanium acetylacetonate, zirconium acetylacetonate, hafnium acetylacetonate, vanadium acetylacetonate, niobium acetylacetonate, tantalum acetylacetonate, chromium acetylacetonate, molybdenum acetylacetonate, tungsten acetylacetonate, manganese acetylacetonate, technetium acetylacetonate, rhenium acetylacetonate, iron acetylacetonate, ruthenium acetylacetonate, osmium acetylacetonate, cobalt acetylacetonate, rhodium acetylacetonate, iridium acetylacetonate, nickel acetylacetonate, palladium acetylacetonate, platinum acetylacetonate, copper acetylacetonate, silver acetylacetonate, zinc acetylacetonate, cadmium acetylacetonate, mercury acetylacetonate, aluminum acetylacetonate, gallium acetylacetonate, indium acetylacetonate, thallium acetylacetonate, tin, lead acetylacetonate, antimony acetylacetonate, lanthanum acetylacetonate, cerium acetylacetonate, praseodymium acetylacetonate, neodymium acetylacetonate, promethium acetylacetonate, samarium acetylacetonate, europium acetylacetonate, gadolinium acetylacetonate, terbium acetylacetonate, dysprosium acetylacetonate, holmium acetylacetonate, erbium acetylacetonate, thulium acetylacetonate, ytterbium acetylacetonate, aluminum acrylate, aluminum methacrylate, aluminum stearate, barium methacrylate, barium acrylate, bismuth 2-ethylhexanoate, calcium methacrylate, calcium acrylate, calcium undecylenate, copper (II) methacrylate, copper (II) 2-ethylhexanoate, hafnium2-ethylhexanoate, iron metacrylate, iron acrylate, lead metacrylate, lead acrylate, lead 2-ethylhexanoate, lithium metacrylate, lithium acrylate, magnesium metacrylate, magnesium acrylate, potassium metacrylate, potassium acrylate, potassium sulfopropylmethacrylate, potassium sulfopropylacrylate, cerium (III) 2-ethylhexanoate, europium (III) acrylate, europium (III) metacrylate, neodymium methacrylate, neodymium neodecanoate, yttrium metacrylate, silver acrylate, silver methacrylate, silver neodecanoate, sodium acrylate, sodium methacrylate, sodium allylsulfonate, strontium acrylate, strontium methacrylate, bis(2-ethylhexanoate)tin, bis(neodecanoate)tin, n-butyltris(2-ethylhexanoate)tin,di-n-butylbis(2-ethylhexanoate)tin, zinc acrylate, zinc methacrylate, zinc neodecanoate, zinc undecanoate, zinc 2-ethylhexanoate, zirconium methacrylate, copper sulphate, zinc chloride, silver nitrate, iron nitrate, nickel nitrate, zinc nitrate, acryloxytri-n-butyltin, acryloxytriphenyltin, di-n-butylbis(2,4-pentanedionate)tin, di-n-butyldiacetoxytin, di-n-butyldiacrylatetin, di-n-butyldilauryltin, di-n-butyldimethacrylatetin, di-n-butyldineodecanoatetin, dimethylbis(2,4-pentanedionate)tin, dimethyldineodecanoatetin, dioctyldilauryltin, methacryloxytri-n-butyltin, tri-n-butylacetoxytin, and tri-n-butylbenzoyloxytin.

Examples of hydrated metal salts (C2) described by Formula (VI) useful in the present method include but are not limited to zinc acetate dihydrate, nickel acetate tetrahydrate, magnesium acetate tetrahydrate, zinc nitrate hexahydrate, and copper sulphate pentahydrate.

Both the non-hydrated metal salts and the hydrated metal salts described above are commercially available through the major chemical vendors, such as Sigma-Aldrich, Fisher Scientific, Alfa-Aesar, Gelest, etc.

The present invention relates to methods for preparing polyheterosiloxanes having at least two non-Si metal elements. In one embodiment, Components (A), (B), and (C) are dispersed or dissolved, water is added and a reaction proceeds forming a polyheterosiloxane having at least two non-Si metal elements.

Another embodiment for preparing a polyheterosiloxane having at least two non-Si metal elements comprises: (1) adding an amount of water to a dispersion comprising at least one Component (A) and at least one Component (B1) or (B2) to form a heterosiloxane containing M1-O—Si linkages; and (2) adding at least one Component (C1) or (C2) and if necessary an additional amount of water to the heterosiloxane containing M1-O—Si linkages such that polyheterosiloxanes having at least two non-Si metal elements are formed, where the total amount of water added is between 50 and 200% of the amount theoretically necessary for the hydrolysis and condensation of all alkoxy groups and other hydrolyzable groups on Components (A), (B), and (C).

Another embodiment for preparing a polyheterosiloxane having at least two non-Si metal elements comprises: (1) adding an amount of water to a dispersion comprising at least one Component (A) and at least one Component (C1) or (C2) to form a mixed metal oxides solution containing M1-O-M2 oxo-linkages, and (2) adding at least one Component (B1) or (B2) to the mixed metal oxides solution containing M1-O-M2 oxo-linkages and if necessary adding an additional amount of water such that polyheterosiloxanes having at least two non-Si metal elements are formed, where the total amount of water added is between 50 and 200% of the amount theoretically necessary for the hydrolysis and condensation of all alkoxy groups and other hydrolyzable groups on Components (A), (B), and (C).

Another embodiment for preparing a polyheterosiloxane having at least two non-Si metal elements comprises: (1) adding an amount of water to a dispersion comprising at least one Component (C1) or (C2) and at least one Component (B1) or (B2) to form a heterosiloxane containing M2-O—Si linkages; and (2) adding at least one Component (A) to the heterosiloxane containing M2-O—Si linkages and if necessary an additional amount of water such that polyheterosiloxanes having at least two non-Si metal elements are formed, where the total amount of water added is between 50 and 200% of the amount theoretically necessary for the hydrolysis and condensation of all alkoxy groups and other hydrolyzable groups on Components (A), (B), and (C).

As used herein, the term "dispersion" in each of the methods means that the molecules of the various components are homogenously distributed. Each of the components may be liquid or solids and so it is preferred that they are pre-mixed or dispersed. Stirring one or more of the components in a solvent is an excellent way to get a homogenous dispersion; or a solvent may not be needed if one or more components can be dispersed in another component. When solvents are used, any kind of solvent is useful including polar solvents, non-polar solvent, hydrocarbon solvents including aromatic and saturated hydrocarbons, alcohols, etc. Examples of solvents useful for dispersing Components (A), (B), and (C) includes hydrocarbonethanol, 1-propanol, isopropanol, 1-butanol, 2-butanol, methoxyethanol, methoxyethoxyethanol, butyl acetate, and toluene, alternatively isopropanol, 1-butanol, 2-butanol, and butyl acetate. One type of solvent could be used or a mixture of different solvents would also be useful. The dispersing or mixing may be done by any conventional means such as stirring.

Generally, the reaction between Components (A), (B), and (C) in each of the methods proceeds at room temperature (20° C.) but if desired, elevated temperatures up to about 140° C. may be used. Alternatively, the temperature can range from 20° C. to 120° C. Generally, the reaction can take between 30 minutes to 24 hours, alternatively 10 minutes to 4 hours.

An optional step in all the methods comprises removing the solvent to produce a solid polyheterosiloxane having at least two non-Si metal elements. The solvents can be removed by any conventional manner such as heating to elevated temperatures or using reduced pressure. This solid material can then be redispersed in a solvent of choice such as toluene, THF, butyl acetate, chloroform, dioxane, 1-butanol, and pyridine. Since the Si—O—M linkages made by the present method can be susceptible to hydrolytic cleavage in the presence of $H_2O$, to ensure longer shelf life it is preferred to minimize the polyheterosiloxane having at least two non-Si metal elements' exposure to moisture.

The polyheterosiloxanes having at least two non-Si metal elements formed by each of the methods have molecular weights (weight average) ranging from 1000 to 1000000, alternatively from 2000 to 100000. In preferred embodiments, the non-Si metal elements are uniformly distributed in the materials and have a domain size smaller than 10 nanometers.

Metal oxides have intrinsic spectral absorption bands, thus exhibit different colors when incorporated into the resins. The polyheterosiloxane resins produced by the present method may be characterized by UV transmission spectroscopy. The present polyheterosiloxane resins exhibit excellent absorption capability in the UV range (280-400 nm). In many instances, the present resins absorb visible light which should enable their use as colorants in coatings.

The polyheterosiloxanes having at least two non-Si metal elements formed by the present methods preferably contain from 1% to 25% by weight alkoxy groups, alternatively, from 5% to 15% by weight alkoxy groups. Although there must be at least 2 non-Si metal elements in each polyheterosiloxane molecule, the molar percentage of the non-Si metal element (M1 and M2) content in the polyheterosiloxane materials can also be from 0.5 to 90 mole percent, alternatively from 5 to 60 mole percent, alternatively from 20 to 50 mole percent. No fatty acid is needed in the present methods.

The molar ratio of M2 to M1 useful in each embodiment ranges from 0.001 to 2, alternatively from 0.05 to 1. The molar ratio of Si units to M1 useful in the present methods range from 0.1 to 200, alternatively from 0.6 to 20.

An amount of water must be added in each embodiment so that polyheterosiloxanes having at least two non-Si metal elements are formed. Since water can also be incorporated via the hydrated metal salts (C2), a person skilled in the art would understand that when hydrated metal salts are utilized either smaller amounts or no additional amounts of water may need to be added in order for the needed amount of water to be present. Generally, the amount of water needed for making polyheterosiloxanes having at least two non-Si metal elements ranges from 50% to 200% of the theoretical amount of water necessary for complete hydrolysis and condensation of all the alkoxy and other hydrolyzable groups present on each of the components. A person skilled in the art would understand that 0.5 mole of water is necessary for hydrolysis and condensation of 1 mole of alkoxy and other hydrolyzable groups. Alternatively, the amount of water needed to make polyheterosiloxanes having at least two non-Si metal elements ranges from 70% to 150% of the theoretical amount of $H_2O$ necessary for complete hydrolysis and condensation of all the alkoxy and other hydrolyzable groups present on each of the components, alternatively, 80% to 120% on the same basis. It is preferred in each of the embodiments that the water is added slowly to ensure the metal alkoxide doesn't react so quickly with the water that it precipitates from the solution. A preferred method of accomplishing this is by diluting the water with solvents. The solvents useful for diluting the water are the same as used for dispersing the components. Depending on the components used and when they are added the needed water may also be added at one time or during one or more of the steps. Other hydrolyzable groups that may be present and need to be hydrolyzed and condensed are any found on the components used including but not limited to chloro.

As described above, the polyheterosiloxanes having at least two non-Si metal elements are soluble in many solvents and are compatible with many polymers, such as epoxy and polyurethane. These advantages, along with the low cost of the metal precursors will facilitate the practical use of the polyheterosiloxanes having at least two non-Si metal elements. The material properties and applications depend on the properties of the metal elements incorporated into the polyheterosiloxane. Potential applications include, but not limited to, UV protective coatings, thermal conductive materials, conductive/antistatic materials, self-cleaning coating, photocatalytic materials, colorants for coatings or paints, gloss/mechanical property enhancement, reinforcement components, adhesive components, scratch/impact resistant coating, and catalysts.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. Room temperature (RT) in the present examples is 20° C.

Solubility of the products were tested by mixing 1 gram of the solid product in 9 grams of solvent, such as THF, toluene, butyl acetate, and chloroform. Soluble means that the solid product dissolves sufficiently in the solvent (without noticeable insoluble solid). As used herein, Me means methyl, Ac means acetate, acac means acetylacetonate, Ph means phenyl.

Example 1

4.40 g $ZnAc_2.2H_2O$, 11.37 g titanium tetraisopropoxide (TPT), 20 g isopropanol (IPA), and 10 g toluene were charged to a 250 ml flask. A slightly cloudy solution was obtained after the mixture was stirred at RT for 1 hour. A silanol-containing organosiloxane was prepared by mixing 5.47 g phenylmethyldimethoxysilane ($PhMeSi(OMe)_2$), 5.95 g phenyltrimethoxysilane ($PhSi(OMe)_3$), and 2.54 g 0.04 M HCl and sonicating the mixture for 40 minutes (Sonicator: Fisher Scientific Instrument (Pittsburgh, Pa.), Model FS60). The silanol-containing organosiloxane solution was added to the 250 ml flask and the solution turned clear after 10 minutes. Stirring was continued at RT for 2 hours. The total amount of $H_2O$ in the reaction mixture was 100% of the amount of water theoretically necessary for complete hydrolysis and condensation of all alkoxy groups. Solvents were removed using a rotary evaporator. No signs of unreacted precursors appear in the GPC analysis of the product. The product was a white solid with a theoretic composition of $Ti_{0.33}Zn_{0.17}D^{PhMe}_{0.25}T^{Ph}_{0.25}$ (6.8 w % alkoxy based on $^{13}C$ NMR) which was soluble in many organic solvents, such as butyl acetate, toluene, THF, and chloroform.

Example 2

0.88 g $AgNO_3$ was dissolved in 1.00 g $H_2O$ and 25 g IPA and the solution was added into a TPT solution containing 13.18 g TPT and 6 g IPA. After stirring at RT for 18 minutes, 30 g toluene was added into the flask. A silanol-containing organosiloxane solution was prepared by mixing 3.65 g phenylmethyldimethoxysilane, 1.99 g phenyltrimethoxysilane, 10 g toluene, and 1.36 g 0.1 M $HNO_3$ and sonicating the mixture for 30 minutes. The silanol-containing organosiloxane solution was added into the 250 ml flask and the solution turned dark brown color. Stirring was continued at RT for 3.5 hours. 0.50 g $H_2O$ in 5.0 g IPA was added to the solution. The total amount of $H_2O$ used was 120%. of the amount of water theoretically necessary for complete hydrolysis and condensation of all alkoxy groups. After stirring at RT for 2 hours the solvents were removed using a rotary evaporator. No signs of unreacted precursors appear in the GPC analysis of the product. The product was a yellow solid with a theoretic composition of $Ti_{0.57}Ag_{0.06}D^{PhMe}_{0.25}T^{Ph}_{0.12}$ (5.8 w % alkoxy based on $^{13}C$ NMR) which was soluble in many organic solvents, such as butyl acetate, acetone, THF, and chloroform.

Example 3-33

A wide variety of polyheterosiloxane materials were synthesized using the same synthetic procedures described above. The metal elements included Li, Na, Mg, Ca, Ba, Y, Ce, Eu, Er, Yb, Ti, Zr, V, Cr, Mn, Fe, Co, Ni, Cu, Ag, Zn, Cd, Al, and Pb—at least one metal element in each column from column 1 to column 14 in the Periodic Table. The polyheterosiloxane materials were solid materials dissolvable in various organic solvents. See Table 1.

TABLE 1

Examples 3-33

| EX | Metal Alkoxide | Metal Salt | Theoretic Composition | $H_2O$ amount |
|---|---|---|---|---|
| 3 | TPT | $CeAc_3 \cdot 1.5H_2O$ | $Ti_{0.48}Ce_{0.024}D^{PhMe}_{0.265}T^{Ph}_{0.237}$ | 81% |
| 4 | TPT | $ZnAc_2 \cdot 2H_2O$ | $Ti_{0.450}Zn_{0.050}D^{PhMe}_{0.250}T^{Ph}_{0.250}$ | 102% |
| 5 | NPZ | $ZnAc_2 \cdot 2H_2O$ | $Zr_{0.275}Zn_{0.275}D^{PhMe}_{0.228}T^{Ph}_{0.223}$ | 110% |
| 6 | TPT | $ZnAc_2 \cdot 2H_2O$ | $Ti_{0.341}Zn_{0.171}D^{Me2}_{0.171}T^{Me}_{0.171}M_{0.147}$ | 88% |

TABLE 1-continued

Examples 3-33

| EX | Metal Alkoxide | Metal Salt | Theoretic Composition | $H_2O$ amount |
|---|---|---|---|---|
| 7 | TPT | $NiAc_2 \cdot 4H_2O$ | $Ti_{0.484}Ni_{0.121}D^{PhMe}_{0.254}T^{Ph}_{0.140}$ | 93% |
| 8 | TPT | $MgAc_2 \cdot 4H_2O$ | $Ti_{0.484}Mg_{0.121}D^{PhMe}_{0.254}T^{Ph}_{0.140}$ | 93% |
| 9 | TPT | $CuAc_2 \cdot 2H_2O$ | $Ti_{0.500}Cu_{0.125}D^{PhMe}_{0.250}T^{Ph}_{0.125}$ | 106% |
| 10 | TPT | $CaAc_2 \cdot H_2O$ | $Ti_{0.500}Ca_{0.125}D^{PhMe}_{0.250}T^{Ph}_{0.125}$ | 129% |
| 11 | TPT | $FeAc_2$ | $Ti_{0.470}Fe^{II}_{0.116}D^{PhMe}_{0.250}T^{Ph}_{0.125}$ | 115% |
| 12 | TPT | $BaAc_2$ | $Ti_{0.500}Ba_{0.125}D^{PhMe}_{0.250}T^{Ph}_{0.125}$ | 100% |
| 13 | TPT | $Mn(acac)_3$ | $Ti_{0.500}Mn_{0.125}D^{PhMe}_{0.250}T^{Ph}_{0.125}$ | 100% |
| 14 | TPT | $Mn(acac)_2$ | $Ti_{0.500}Mn_{0.125}D^{PhMe}_{0.250}T^{Ph}_{0.125}$ | 100% |
| 15 | TPT | $CdAc_2 \cdot 2H_2O$ | $Ti_{0.500}Cd_{0.125}D^{PhMe}_{0.250}T^{Ph}_{0.125}$ | 120% |
| 16 | TPT | $V(acac)_3$ | $Ti_{0.500}V_{0.125}D^{PhMe}_{0.250}T^{Ph}_{0.125}$ | 130% |
| 17 | $Al(O^sBu)_3$ | $Zn(acac)_2$ | $Al_{0.400}Zn_{0.200}D^{PhMe}_{0.300}T^{Ph}_{0.100}$ | 104% |
| 18 | NPZ | $Ag(NO_3)$ | $Zr_{0.450}Ag_{0.050}D^{PhMe}_{0.333}T^{Ph}_{0.167}$ | 110% |
| 19 | TPT | $CoAc_2 \cdot 4H_2O$ | $Ti_{0.500}Co_{0.125}D^{PhMe}_{0.250}T^{Ph}_{0.125}$ | 120% |
| 20 | TPT | $Cr(acac)_3$ | $Ti_{0.444}Cr_{0.111}D^{PhMe}_{0.333}T^{Ph}_{0.111}$ | 104% |
| 21 | TPT | $Fe(NO_3)_3 \cdot 9H_2O$ | $Ti_{0.500}Fe_{0.125}D^{PhMe}_{0.250}T^{Ph}_{0.125}$ | 110% |
| 22 | TPT | $Zn(NO_3)_2 \cdot 6H_2O$ | $Ti_{0.500}Zn_{0.125}D^{PhMe}_{0.250}T^{Ph}_{0.125}$ | 110% |
| 23 | TPT | $Ni(NO_3)_2 \cdot 6H_2O$ | $Ti_{0.500}Ni_{0.125}D^{PhMe}_{0.250}T^{Ph}_{0.125}$ | 110% |
| 24 | TPT | $CuSO_4 \cdot 5H_2O$ | $Ti_{0.458}Ni_{0.114}D^{PhMe}_{0.352}T^{Ph}_{0.076}$ | 100% |
| 25 | TPT | NaAc | $Ti_{0.414}Na_{0.103}D^{PhMe}_{0.345}T^{Ph}_{0.138}$ | 100% |
| 26 | TPT | Li(acac) | $Ti_{0.400}Li_{0.100}D^{PhMe}_{0.400}T^{Ph}_{0.100}$ | 120% |
| 27 | TPT | $ZnCl_2$ | $Ti_{0.400}Zn_{0.200}D^{PhMe}_{0.300}T^{Ph}_{0.100}$ | 100% |
| 28 | TPT | $EuAc_3 \cdot xH_2O, x\sim4$ | $Ti_{0.600}Eu_{0.030}D^{PhMe}_{0.270}T^{Ph}_{0.100}$ | 110% |
| 29 | TPT | $ErAc_3 \cdot xH_2O, x\sim4$ | $Ti_{0.600}Er_{0.030}D^{PhMe}_{0.270}T^{Ph}_{0.100}$ | 110% |
| 30 | TPT | $YbAc_3 \cdot 4H_2O$ | $Ti_{0.600}Yb_{0.030}D^{PhMe}_{0.270}T^{Ph}_{0.100}$ | 110% |
| 31 | NBZ | $EuAc_3 \cdot xH_2O, x\sim4$ | $Zr_{0.520}Eu_{0.028}D^{PhMe}_{0.339}T^{Ph}_{0.113}$ | 110% |
| 32 | NBZ | $Y(acac)_3$ | $Zr_{0.500}Y_{0.100}D^{PhMe}_{0.300}T^{Ph}_{0.100}$ | 110% |
| 33 | TPT | $PbAc_2 \cdot 3H_2O$ | $Ti_{0.500}Pb_{0.100}D^{PhMe}_{0.300}T^{Ph}_{0.100}$ | 110% |

Example 34

5.32 g $Sn(Ac)_4$, 5.1 g $Ti(O^nBu)_4$, 15 g 1-BuOH was charged to a 250 ml flask. Under stirring, a solution containing 0.86 g $H_2O$ and 20 g 1-BuOH was slowly added. The solution was clear after 30 minutes. A silanol-containing organosiloxane solution was prepared by mixing 3.12 g $Si(OEt)_4$, 19 g 1-BuOH, and 0.60 g 0.1 M HCl and sonicating the mixture for 30 minutes. The silanol-containing organosiloxane solution was added to the 250 ml flask and the solution was still clear after stirring at RT for 4 hours. The amount of $H_2O$ used was 90%. of the amount of water theoretically necessary for complete hydrolysis and condensation of all alkoxy groups. Solvents were removed using a rotary evaporator. No signs of unreacted precursors appear in the GPC analysis of the product. The product was a white solid with a theoretic composition of $Ti_{0.333}Sn_{0.333}Q_{0.333}$ which was soluble in butyl acetate, toluene, THF, and 1-BuOH.

Example 35

4.39 g $Zn(Ac)_2 \cdot 2H_2O$, 9.60 g zirconium tetra(n-butoxide) (NBZ, 80% in 1-BuOH), 15 g 1-BuOH was charged to a 250 ml flask. The solution was clear after 20 minutes. 3.22 g phenyl trimethoxysilane and 3.03 g phenylmethyldimethoxysilane was added and stirred for 10 minutes. Then 1.12 g 0.1 N HCl (6% in 1-BuOH) was added slowly and then 20 g toluene. The solution was still clear after stirring at RT for 4 hours. The amount of $H_2O$ used was 100% of the amount of water theoretically necessary for complete hydrolysis and condensation of all alkoxy groups. Solvents were removed using a rotary evaporator. No signs of unreacted precursors appear in the GPC analysis of the product. The product was a white solid with a theoretic composition of $Zr_{0.275}Zn_{0.275}D^{PhMe}_{0.228}T^{Ph}_{0.223}$ (8.4 w % alkoxy based on $^{13}C$ NMR) which was soluble in butyl acetate, toluene, and THF.

Example 36

9.1 g TPT, 10 g IPA was charged to a 250 ml flask. Under stirring, a silanol-containing organosiloxane solution which was prepared by mixing 1.98 g $PhSi(OMe)_3$, 3.65 g $PhMeSi(OMe)_2$, 4.5 g toluene, 1.1 g IPA, and 1.26 g 0.1 N HCl and sonicating the mixture for 30 minutes was slowly added. Solution turned milky after 10 minutes. 20 g toluene was then added and the solution turned clear. Then added 1.72 g $Mg(Ac)_2 \cdot 4H_2O$ and 0.10 g $H_2O$ in 10 g IPA. The amount of $H_2O$ used was 100%. of the amount of water theoretically necessary for complete hydrolysis and condensation of all alkoxy groups. The solution was clear after stirring at RT for 4 hours. Solvents were removed using a rotary evaporator. No signs of unreacted precursors appear in the GPC analysis of the product. The product was a white solid with a composition of $Ti_{0.457}Mg_{0.114}D^{PhMe}_{0.286}T^{Ph}_{0.143}$ which was soluble in butyl acetate, toluene, and THF.

Example 37

3.24 g $Al(acac)_2$ was dispersed in a silanol-containing organosiloxane solution which was prepared by mixing 1.98 g $PhSi(OMe)_3$, 3.65 g $PhMeSi(OMe)_2$, 4.5 g toluene, 1.1 g IPA, and 1.26 g 0.1 N HCl and sonicating the mixture for 30 minutes. The dispersion was stirred at RT for 30 minutes. Then 8.53 g TPT and 10 g IPA was added to the dispersion. Under stirring, 1.01 g $H_2O$ (6% in IPA) was slowly added. The amount of $H_2O$ used was 100%. of the amount of water theoretically necessary for complete hydrolysis and condensation of all alkoxy groups. The solution was clear after stirring at RT for 4 hours. Solvents were removed using a rotary evaporator. No signs of unreacted precursors appear in the GPC analysis of the product. The product was a white solid with a theoretic composition of $Ti_{0.469}Al_{0.156}D^{PhMe}_{0.250}T^{Ph}_{0.125}$ (7.4 w % alkoxy based on $^{13}C$ NMR) which was soluble in butyl acetate, toluene, and THF.

Example 38

2.64 g $Zn(Ac)_2 \cdot 2H_2O$, 13.65 g TPT, 5.47 g PhMeSi(OMe)$_2$, 1.99 g PhSi(OMe)$_3$, 10 g IPA, and 30 g toluene were charged to a 250 ml flask. The dispersion was stirred at RT for 40 minutes. Then 2.12 g 0.1 N HCl (4% in IPA) was slowly added to the flask. The total amount of $H_2O$ was 100% of the amount of water theoretically necessary for complete hydrolysis and condensation of all alkoxy groups. The solution was clear after stirring at RT for 3 hours. Solvents were removed using a rotary evaporator. The product was a white solid with a theoretic composition of $Ti_{0.48}Zn_{0.12}D^{PhMe}_{0.30}T^{Ph}_{0.10}$ was soluble in butyl acetate, toluene, and THF.

Comparative Example 1

No Metal Salt Used 6.17 g Sn(O$^t$Bu)$_4$, 5.10 g Ti(O"Bu)$_4$, and 3.12 g Si(OEt)$_4$ was mixed in a 250-ml flask. 3 w % $H_2O$/1-BuOH solution was added slowly into the flask under stirring. At 60% stoichiometric amount of $H_2O$, the solution was still clear after refluxing for 30 min. At 80% stoichiometric amount of $H_2O$ it gelled and the solid was not soluble in Toluene, IPA, 1-BuOH, and butyl acetate. Calculation of the theoretic alkoxy content in the product at 60% stoichiometric amount of $H_2O$ was 55 wt %.

Application Examples

Metal oxides have intrinsic absorption bands, thus exhibit different colors when incorporated into the resins. The UV transmission spectra of various polyheterosiloxane resins of the above examples exhibited excellent absorption capability in the UV range (280-400 nm).

Polyurethane coatings were formulated using Bayer Desmophen A870 and Desmodur N3390. A typical formulation was composed of 0.60 g polyheterosiloxane resin, 2.58 g butyl acetate, 8.00 g Desmophen A870, and 2.96 g Desmodur N3390. The gel time greatly changed from more than 8 hours (uncatalyzed) to less than 2 minutes (catalyzed with Si+Ti+V resins).

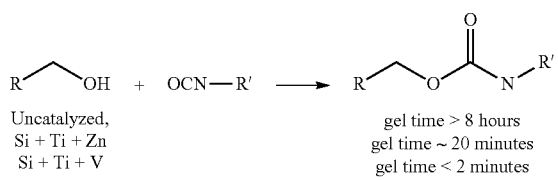

Uncatalyzed, gel time > 8 hours
Si + Ti + Zn gel time ~ 20 minutes
Si + Ti + V gel time < 2 minutes

The invention claimed is:

1. A method for preparing a polyheterosiloxane having at least two non-Si metal elements comprising:
   (1) reacting
      (A) a metal (M1) alkoxide, and
      (C) a hydrolyzable metal (M2) salt, where (M1) and (M2) are non-Si metal elements and different from each other,
      with an amount of water to form a mixed metal oxides solution; and
   (2) further reacting the mixed metal oxides solution and (B) a silicon-containing material having hydrolyzable groups selected from at least one component
      (B1) an organosiloxane, or
      (B2) a silane, and
      if necessary adding an additional amount of water to form the polyheterosiloxane, such that total amount of the water added is between 50 and 200% of that necessary to hydrolyze and condense the alkoxy groups and other hydrolyzable groups on Components (A), (B), and (C), to form the polyheterosiloxane, and with the proviso that at least two non-Si metal elements are provided by Component (A) and/or (C).

2. The method according to claim 1 wherein;
(A) the metal (M1) alkoxide is selected from metal alkoxides having a general formula (I) $R^1_m M1O_n X_p (OR^2)_{v1-m-p-2n}$, where M1 is selected from Ti, Al, Ge, Zr, Sn, Cr, Ca, Ba, Sb, Cu, Ga, Hf, In, Fe, Mg, Mo, Nb, Ce, Er, La, Nd, Pr, Sm, Y, Sr, Ta, Te, W, and V, each X is independently selected from carboxylate ligands, organosulfonate ligands, organophosphate ligands, β-diketonate ligands, and chloride ligands, v1 is the oxidation state of M1, m is a value from 0 to 3, n is a value from 0 to 2, p is a value from 0 to 3, each $R^1$ is an alkyl group having from 1 to 18 carbon atoms, each $R^2$ is an independently selected monovalent alkyl group having from 1 to 6 carbon atoms, aryl group having from 6 to 8 carbon atoms, or a polyether group having a general formula (VI) —$(R^{30})_q R^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms,
(B) the silicon-containing material is selected from (B1) an organosiloxane having an average formula (II) $R^5_b (R^6O)_a SiO_{(4-(a+b))/2}$ or (B2) a silane having a general formula (III) $R^5_c SiY_d$, where Y is Cl or OR$^6$, each $R^5$ is an independently selected hydrogen atom, alkyl group having 1 to 18 carbon atoms, alkenyl group having from 2 to 18 carbon atoms, aryl group having from 6 to 12 carbon atoms, epoxy group, amino group, or carbinol group, $R^6$ is an independently selected hydrogen atom or alkyl group having from 1 to 6 carbon atoms, aryl group having from 6 to 8 carbon atoms, or a polyether group having a general formula (VI) —$(R^{30})_q R^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms, a is a value from 0.1 to 3, b is a value from 0.5 to 3, and (a+b) is a value from 0.6 to 3.9, c is a value from 0 to 3, d is a value from 1 to 4 and (c+d) equals 4, and
(C) the hydrolyzable metal (M2) salt is selected from (C1) a non-hydrated metal salt having a general formula (IV) $R^7_e M2(Z)_{(v2-e)/w}$ or (C2) a hydrated metal salt having a general formula (V) $M2(Z)_{v2/w} \cdot xH_2O$, where M2 is selected from any of the metal elements in the periodic table, v2 is the oxidation state of M2, w is the oxidation state of ligand Z where Z is independently chosen from carboxylates, β-diketonates, fluoride, chloride, bromide, iodide, organic sulfonate, nitrate, nitrite, sulphate, sulfite, cyanide, phosphites, phosphates, organic phosphites, organic phosphates, and oxalate, each $R^7$ is an independently selected alkyl group having 1 to 18 carbon atoms, alkenyl group having from 2 to 8 carbon atoms, or aryl group having from 6 to 8 carbon atoms, e is a value from 0 to 3 and x is a value from 0.5-12.

3. The method according to claim 1, wherein M2 is selected from Li, Na, Ca, Mg, Ba, Ti, Zr, Ce, Eu, Nd, Er, Yb, Y, V, Cr, Mn, Fe, Co, Ni, Cu, Ag, Zn, Cd, Al, Ge, and Pb.

4. The method according to claim 2 wherein: (1) Component (A) and at least one Component (C1) or (C2) are reacted with an amount of water to form a mixed metal oxides solution containing M1-O-M2 oxo-linkages; (2) further reacting at least one Component (B1) or (B2) with the mixed metal oxides solution containing M1-O-M2 oxo-linkages and if necessary adding an additional amount of water to form the polyheterosiloxane.

5. The method according to claim 1 where the total amount of water added is between 70 and 150% of the amount theoretically necessary for the hydrolysis and condensation of all alkoxy groups and other hydrolyzable groups.

6. The method according to claim 1 where the total amount of water added is between 80 and 120% of the amount theoretically necessary for the hydrolysis and condensation of all alkoxy groups and other hydrolyzable groups.

7. A polyheterosiloxane prepared by the method of claim 1.

8. A coating composition comprising the polyheterosiloxane of claim 7.

* * * * *